(12) United States Patent
Yamada et al.

(10) Patent No.: US 8,094,544 B2
(45) Date of Patent: Jan. 10, 2012

(54) OPTICAL INFORMATION RECORDING MEDIUM REPRODUCING DEVICE

(75) Inventors: Hirohisa Yamada, Osaka (JP); Masaki Yamamoto, Osaka (JP); Yasuhiro Harada, Osaka (JP); Go Mori, Osaka (JP); Hideharu Tajima, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/734,190

(22) PCT Filed: Oct. 17, 2008

(86) PCT No.: PCT/JP2008/068904
§ 371 (c)(1),
(2), (4) Date: Jul. 6, 2010

(87) PCT Pub. No.: WO2009/051246
PCT Pub. Date: Apr. 23, 2009

(65) Prior Publication Data
US 2010/0278026 A1    Nov. 4, 2010

(30) Foreign Application Priority Data
Oct. 19, 2007    (JP) .................................. 2007-273203

(51) Int. Cl.
*G11B 7/24* (2006.01)
(52) U.S. Cl. ................ 369/275.3; 369/275.4; 369/47.53
(58) Field of Classification Search .................... None
See application file for complete search history.

(56) References Cited

U.S. PATENT DOCUMENTS
5,886,973 A    3/1999  Iida
6,430,128 B1 *  8/2002  Kato et al. ................ 369/47.53
6,965,556 B1   11/2005  Kikukawa et al.
2001/0033517 A1 * 10/2001  Ando et al. .................... 365/200
2003/0043939 A1 *  3/2003  Okumura et al. ............. 375/341
(Continued)

FOREIGN PATENT DOCUMENTS
JP           07-073506 A        3/1995
(Continued)

OTHER PUBLICATIONS
International Search Report dated Dec. 22, 2008, issued in PCT/JP2008/068904.

*Primary Examiner* — Paul Huber
(74) *Attorney, Agent, or Firm* — Edwards Wildman Palmer LLP; David G. Conlin; George N. Chaclas

(57) ABSTRACT

An optical information recording medium reproducing device (1) reproduces information from a super-resolution optical information recording medium (100a) having the information stored therein by positioning, according to a random pattern system, a plurality of recording marks including a recording mark shorter than a resolution limit of an optical system. This reproducing device (1) performs test readings for measuring indexes each relating to a reproduction quality of the super-resolution optical information recording medium (100a) by emitting laser light onto a storage surface of the super-resolution optical information recording medium (100a), while changing a reproduction laser power from a predetermined initial value, and based on the indexes measured, sets a reproduction laser power for reproducing the information. Thus, since the reproduction laser power for reproducing the information stored in the super-resolution optical information recording medium (100a) is determined based on the test readings results, a favorable reproduction quality can be obtained.

4 Claims, 6 Drawing Sheets

U.S. PATENT DOCUMENTS

| | | |
|---|---|---|
| 2004/0114482 A1 | 6/2004 | Yano et al. |
| 2005/0190630 A1* | 9/2005 | Fujimoto et al. ......... 365/230.05 |
| 2005/0237912 A1 | 10/2005 | Kikukawa et al. |
| 2007/0140083 A1* | 6/2007 | Bae et al. .................... 369/47.53 |
| 2007/0206482 A1* | 9/2007 | Aoyama et al. ............... 369/116 |
| 2007/0268801 A1* | 11/2007 | Park et al. .................... 369/52.1 |
| 2011/0044148 A1* | 2/2011 | Tajima et al. ................. 369/100 |

FOREIGN PATENT DOCUMENTS

| | | |
|---|---|---|
| JP | 07-320291 A | 12/1995 |
| JP | 09-320094 A | 12/1997 |
| JP | 2001-250274 A | 9/2001 |
| JP | 2002-230778 A | 8/2002 |
| JP | 2003-045034 A | 2/2003 |
| JP | 2006-018976 A | 1/2006 |

* cited by examiner

F I G. 2
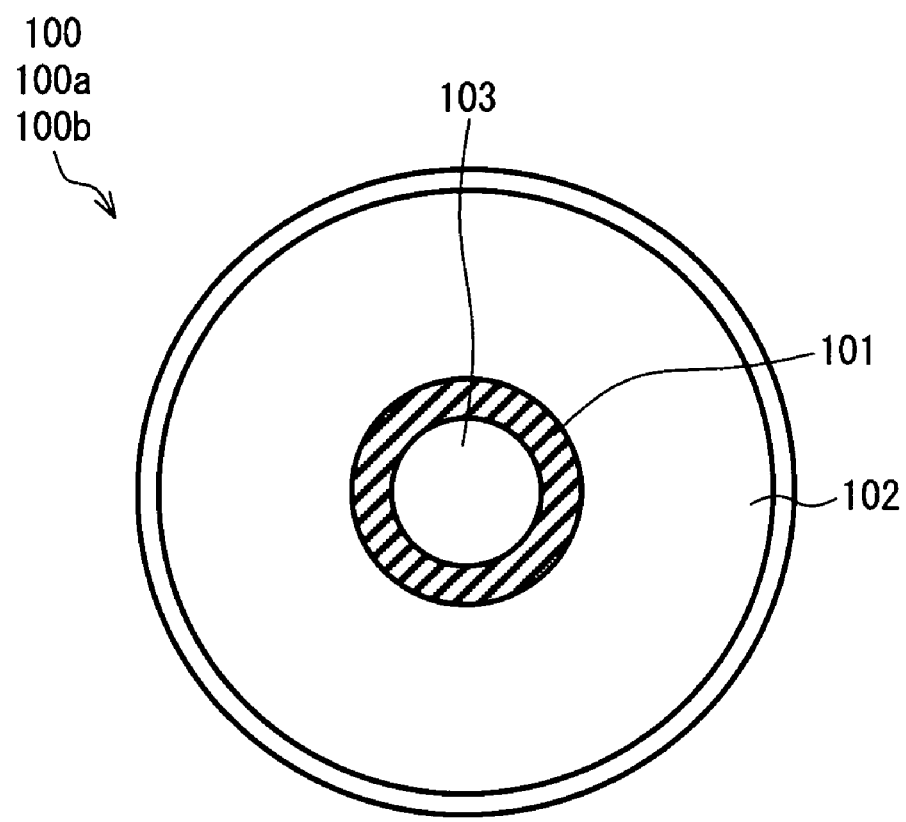

F I G. 8
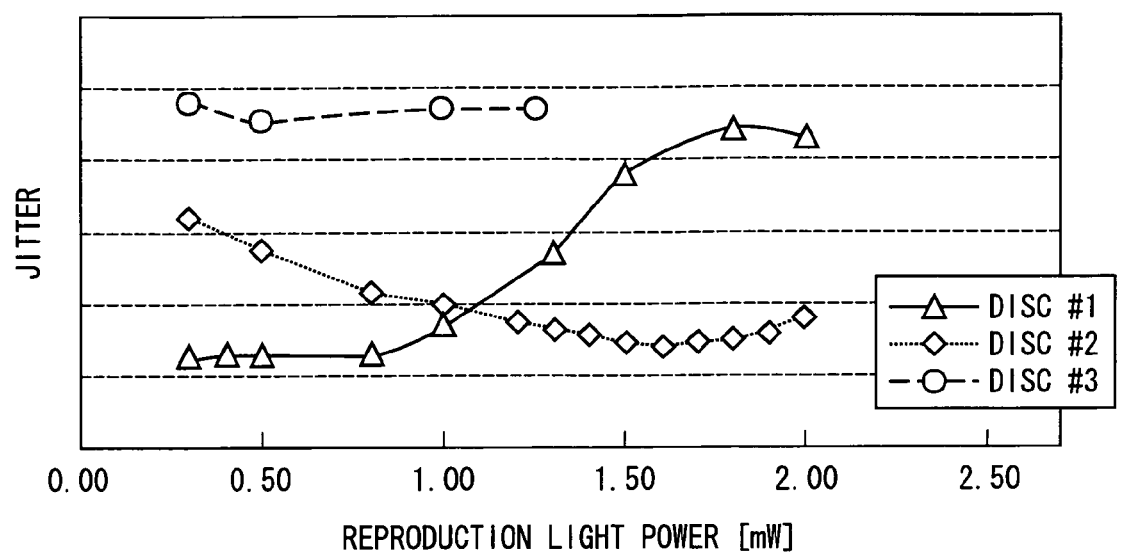

OPTICAL INFORMATION RECORDING MEDIUM REPRODUCING DEVICE

CROSS REFERENCE TO RELATED APPLICATION

This application is the U.S. national phase, pursuant to 35 U.S.C. §371, of international application No. PCT/JP2008/068904 filed Oct. 17, 2008, published in Japanese on Jul. 6, 2010, which claims the benefit of Japanese application Ser. No. 2007-273203, filed Oct. 19, 2007, the disclosure of which applications are incorporated herein in their entireties by this reference.

TECHNICAL FIELD

The present invention relates to: an optical information recording medium reproducing device for reproducing information from an optical information recording medium allowing information to be recorded therein and reproduced therefrom by light such as a laser beam or to be only reproduced therefrom by the light; and the optical information recording medium. Particularly, the present invention relates to an optical information recording medium reproducing device for an optical information recording medium employing a super-resolution optical information recording medium technique capable of reproducing information specified by a recording mark equal to or shorter than an optical resolution which is determined by a diffraction-limited optical spot diameter; and the optical information recording medium.

BACKGROUND ART

Recently, along with the advance in the information technologies, the multimedia technologies, and the multimedia technologies, there has been an increasing demand for optical information recording media having a higher density and a larger capacity.

An upper limit of a recording density of the optical information recording medium is determined mainly by a spot diameter of a light beam for information recording or reproduction. The reason for this is as follows: As a recording mark on the optical information recording medium is reduced in diameter for increasing a density, a plurality of recording marks are included in a spot region, and consequently the recording marks cannot be detected.

Incidentally, the spot diameter of a light beam is substantially expressed by $\lambda/NA$, where $\lambda$ is a wavelength of light emitted from a light source, and NA is a numerical aperture of an objective lens for forming the optical spot. Therefore, for the optical information recording medium, an effort has been made to substantially improve a recording density by reducing the spot diameter of the light beam by shortening the wavelength $\lambda$ of light emitted from the light source and increasing the numerical aperture NA of the objective lens.

However, it is considered that the wavelength $\lambda$ of light emitted from the light source cannot be shortened to below a wavelength in an ultraviolet ray range, due to (i) absorption by an optical element and (ii) restriction given by sensitivity properties of a detector. Further, an improvement in the numerical aperture NA of the objective lens is limited by a tolerance on inclination of an optical axis of a light beam with respect to the optical information recording medium. Therefore, there is a limit on the effort to improve a recording density by reducing the spot diameter of a light beam by changing the NA or the wavelength $\lambda$ of light emitted from the light source.

Accordingly, an effort has been made to develop an optical information recording medium employing a super-resolution technique, which enables reproduction of information specified by a recording mark having a length equal to or shorter than a diffraction limit (hereinafter, referred to as "equal to or shorter than a light diffraction limit") of a reproduction optical system. Hereinafter, the optical information recording medium employing this technique is referred to as "super-resolution optical information recording medium". Also, reproduction of information specified by a recording pit having a recording mark length equal to or shorter than the light diffraction limit which reproduction uses the above technique is referred to as "super-resolution reproduction".

Generally, it is said that the light diffraction limit of the reproduction optical system is approximately $\lambda/(2NA)$ ($\lambda$: a reproduction light wavelength, NA: an aperture ratio of a lens), due to a restriction given by a frequency limit of a detectable signal.

The "approximately $\lambda/(2NA)$" corresponds to a cycle size of a pattern constituted by repetitions of a single-size recording mark and a single-size space, and it is known that half of this, i.e., approximately $\lambda/(4NA)$ is a resolution limit in terms of a recording mark length. Thus, hereinafter, the resolution limit means $\lambda/(4NA)$, which is the resolution limit in terms of the recording mark length. Note that an actual resolution limit is determined also by effects given by other elements in the optical system, in addition to the theory; therefore, a value of the resolution limit may deviate to some degree from the theoretical value obtained according to the wavelength and the numerical aperture.

As a technique for exceeding the resolution limit to enable the super-resolution reproduction, there is a super-resolution technique as described in Patent Literature 1.

Patent Literature 1 discloses, as an example of an optical information recording medium employing the above-described super-resolution technique, an optical information recording medium for which information recording or reproduction is performed by emission of laser light, the optical information recording medium including a phase-change recording film, a reflective film, and a carbon thin film provided in the vicinity of the phase-change recording film, the carbon thin film serving as a signal enhancing film.

Further, the optical information recording medium described in Patent Literature 1 employs a system by which recording marks having the same form and each having a length equal to or shorter than the light diffraction limit are positioned along a direction in which signal reproduction is performed. From the optical information recording medium described in Patent Literature 1, information specified by single-frequency repeating phase pits (a mark-to-space ratio of 1 to 1; hereinafter, referred to as "monotone pattern system") is reproduced. Furthermore, C/N (Carrier to Noise ratio) is employed to evaluate a reproduction property of this optical information recording medium. According to this evaluation, Patent Literature 1 describes the results of examples relating to the super-resolution reproduction.

Additionally, Patent Literature 1 describes that a reproduction laser power for reproducing the super-resolution optical information recording medium needs to be greater than that for reproducing an optical information recording medium which does not need the super-resolution reproduction. Further, Patent Literature 1 also discloses a phenomenon that, as a reproduction laser power increased, phase-change recording marks were broken, and accordingly reproduction signals were reduced. Patent Literature 1 assumes that the breakage of the phase-change recording marks was triggered by the heat. Thus, there is a problem with infinitely increasing a reproduction laser power in order to reproduce information from such the super-resolution optical information recording medium.

Patent Literature 1

Japanese Patent Application Publication, Tokukai, No. 2006-18976 A (Publication Date: Jan. 19, 2006)

Patent Literature 2

Japanese Patent Application Publication, Tokukai, No. 2001-250274 A (Publication Date: Sep. 14, 2001)

Incidentally, optical information recording media generally employ a system (hereinafter, referred to as "random pattern system") by which a plurality of marks having lengths regularly different from each other are positioned according to a predetermined system along a direction in which signal reproduction is performed, rather than the monotone pattern system disclosed in Patent Literature 1.

The reason for this is that a recording density can be improved more when information is stored according to the random pattern system than when the information is stored according to the monotone pattern system. This also applies in the optical information recording medium employing the super-resolution technique, which enables reproduction of information specified by the recording mark having a length equal to or shorter than the light diffraction limit.

Note that there are a lot of examples of practical application of the random pattern system. For example, CD (Compact Disk) employs the EFM (8-14) (Eight to Fourteen Modulation). DVD (Digital Versatile Disk), Blu-Ray (Registered Trademark) Disc (BD), and HD-DVD employ modulation modes different from that employed by CD. Specifically, DVD employs the EFM Plus (8-16); BD employs the 1-7PP modulation; and HD-DVD employs the ETM (8-12). Thus, a lot of optical information recording media employ the random pattern system which can improve the recording density.

As a result of studies, the inventors of the present invention found the following fact: In reproduction of information from an optical information recording medium which information is stored in the optical information recording medium according to a random pattern system including a recording mark having a length equal to or shorter than the light diffraction limit, improving C/N only does not necessarily provide a favorable reproduction quality, and therefore it is important to evaluate and reduce jitter.

In reproduction of information from an optical information recording medium which information is stored in the optical information recording medium according to the random pattern system, which is a generally-used recording system, a reproduction signal quality is important. The reproduction signal quality can be evaluated by various indexes such as C/N, jitter, a bit error rate, or asymmetry of a reproduction signal waveform.

Reproduction of information from an optical information recording medium is performed in such a manner that a reproduction light beam is emitted onto a recording mark specifying the information, and then a change in an amount of reflected light (reflection intensity) therefrom is detected by a detector, so that a signal is reproduced. Actually, in this process, there occurs a position error in a transition point of a signal, i.e., jitter. The jitter occurs due to factors such as (i) a noise caused by a laser, (ii) crosstalk resulting from diffraction light coming from an adjacent track, and/or (iii) a noise resulting from a media defect. If the jitter becomes greater, this causes a reading error in the reproduction system, thereby making it difficult to perform stable reproduction. In view of this, in order to realize stable super-resolution reproduction and a super-resolution optical information recording medium having a higher density, reduction of jitter is indispensable.

In reproduction of information from an optical information recording medium on which only recording marks each having a recording mark length longer than the light diffraction limit are formed, improving C/N reduces jitter. That is, there is a correlation between C/N and jitter. Therefore, in this case, the reproduction signal quality can be improved only by evaluating and improving C/N.

On the other hand, in a case of the optical information recording medium in which information is stored according to the random pattern system including the recording mark having a length equal to or shorter than the light diffraction limit, improving C/N only does not necessarily reduce jitter. In light of this, the inventors of the present invention found that evaluation of jitter is also necessary to improve a reproduction signal quality.

As a result of further studies, the inventors of the present invention found the following fact: In reproduction of information from the super-resolution optical information recording medium which information is stored according to this random pattern system, jitter greatly depends on a reproduction laser power.

In reproduction of information from an optical information recording medium which information is stored in the optical information recording medium according to a conventional random pattern system generally including pits each equal to or longer than the diffraction limit of the reproduction optical system, jitter occurring while the information is reproduced from the optical information recording medium does not depend on a laser power applied thereto. Therefore, in this case, prior to reproduction of content in the optical information recording medium, no special process (hereinafter, referred to as "test reading system") is required which sets a reproduction laser power for optimizing a reproduction signal quality such as jitter.

However, it was found that, in reproduction of information from the super-resolution optical information recording medium which information is stored according to the random pattern system, jitter greatly depends on a reproduction laser power.

In other words, prior to reproduction of content of the optical information recording medium, such the system is required which sets the reproduction laser power for optimizing a reproduction signal quality such as jitter. Further, the problem described in the above-described Patent Literature 1, i.e., the problem that reproduction signals are reduced as a reproduction laser power increases also applies in the super-resolution optical information recording medium in which the information is stored according to the random pattern system; therefore, also from the viewpoint of solving this problem, it is strongly demanded to set an optimum reproduction laser power for reproducing information from the super-resolution optical information recording medium.

SUMMARY OF INVENTION

The present invention was made in view of the foregoing problems, and an object of the present invention is to provide an optical information recording medium reproducing device and an optical information recording medium with each of which an optimum reproduction laser power can be determined and stable super-resolution reproduction can be achieved.

An optical information recording medium reproducing device of the present invention is for reproducing information from an optical information recording medium, the optical information recording medium having the information stored therein by positioning a plurality of marks according to a predetermined system, the plurality of marks having lengths regularly different from each other and including a mark shorter than an optical system resolution limit of the optical information recording medium reproducing device, the optical information recording medium reproducing device performing, by emission of laser light, a plurality of test readings each measuring an index relating to a reproduction quality of the optical information recording medium, in order to set, according to the indexes measured, a reproduction laser power for reproducing the information, the plurality of test readings being performed while a reproduction laser power is changed from a predetermined initial value.

Here, among super-resolution optical information recording media, there is a super-resolution optical information recording medium for which a reproduction laser power and a reproduction quality are correlated with each other. Note that this super-resolution optical information recording medium employs a so-called random pattern system, by which a plurality of marks having lengths regularly different from each other are positioned according to a predetermined system along a direction in which signal reproduction is performed. The "marks" herein refer to (i) pits forming protrusions and recesses or (ii) recording marks that an optical information recording medium recording device forms on the optical information recording medium during recording.

With the above arrangement, in reproduction of the information from the super-resolution optical information recording medium, the optical information recording medium reproducing device performs the test readings in order to set the reproduction laser power optimum for reproduction of the information from the optical information recording medium. Then, according to the indexes each relating to the reproduction quality which indexes have been obtained as a result of the test readings, the reproduction laser power is determined. Thus, it is possible to determine the reproduction laser power favorable for reproduction of the information from the optical information recording medium, thereby achieving an excellent reproduction quality.

Further, it is possible to reproduce the information from the optical information recording medium without emitting an unnecessarily large reproduction laser power onto a storage surface of the optical information recording medium. This prevents deterioration and the like of a reproduction quality of the optical information recording medium as a medium, thereby improving durability against repeated reproduction.

Here, the predetermined initial value is set as the reproduction laser power for performing the first test reading, and then the first test reading is started. The predetermined initial value refers to, for example, a reproduction laser power suitable for reproduction of information from the optical information recording medium which reproduction laser power has been obtained in advance by e.g., measurement under a standard condition.

In a case of an optical information recording medium having a large margin (reproduction laser power margin) for a practical reproduction signal quality with respect to a fluctuation in a reproduction laser power, or in a case where the reproduction laser power margin does not change according to the environment surrounding the super-resolution optical information recording medium, an efficient way to set an optimum reproduction laser power is, for example, as follows:

A reproduction laser power is fluctuated around a reproduction laser power which is set, so that a reproduction laser power at which jitter has a lowest value is set as an optimum reproduction laser power.

By following this way, it is possible to perform the test readings efficiently. Further, in this way, it is possible to determine an optimum reproduction laser power quickly.

Note that, in changing the reproduction laser power, either an increase or a reduction may come first, and certain changes may be alternately repeated. Alternatively, after recommended reproduction laser power information is obtained, a recommended laser power specified by the recommended reproduction laser power information may be set as an optimum reproduction laser power.

An optical information recording medium reproducing device of the present invention is for reproducing information from an optical information recording medium, the optical information recording medium having the information stored therein by positioning a plurality of marks according to a predetermined system, the plurality of marks having lengths regularly different from each other and including a mark shorter than an optical system resolution limit of the optical information recording medium reproducing device, the optical information recording medium reproducing device performing, by emission of laser light, a plurality of test readings each measuring an index relating to a reproduction quality of the optical information recording medium, in order to set, according to the indexes measured, a reproduction laser power for reproducing the information, the plurality of test readings being performed while a reproduction laser power is changed from a predetermined initial value by a predetermined change amount.

With this arrangement, in reproduction of the information from the super-resolution optical information recording medium, the optical information recording medium reproducing device performs the test readings in order to set the reproduction laser power optimum for reproduction of the information from the optical information recording medium. Then, according to the indexes each relating to the reproduction quality which indexes have been obtained as a result of the test readings, the reproduction laser power is determined. Thus, it is possible to determine the reproduction laser power favorable for reproduction of the information from the optical information recording medium, thereby achieving an excellent reproduction quality.

Further, it is possible to reproduce the information from the optical information recording medium without emitting an unnecessarily large reproduction laser power onto a storage surface of the optical information recording medium. This prevents deterioration and the like of a reproduction quality of the optical information recording medium as a medium, thereby improving durability against repeated reproduction.

Here, in order to perform the test readings, (a) the initial value (test reading start power), i.e., a reproduction laser power at which the first test reading is started, and (b) a scanning interval, i.e., the predetermined change amount, are set. Note that the predetermined initial value and the predetermined change amount are recommended by a manufacturer of the optical information recording medium as an initial value and a change amount for performing test readings for the optical information recording medium, and are stored in the optical information recording medium. For example, under a standard condition, i.e., in an assumed environment for reproduction of information from the optical information recording medium, the manufacturer measures a signal quality during reproduction in advance. According to the result, the manufacturer obtains a reproduction laser power and a change amount each of which is favorable for performing test readings for the optical information recording medium. Then, the manufacturer stores these reproduction laser power and change amount in the optical information recording medium as the predetermined initial value and the predetermined change amount.

Firstly, the first test reading is performed with the reproduction laser power set as the test reading start power. For a reproduction laser power used in the second test reading, the test reading start power is changed by an amount specified by the scanning interval. In this manner, the reproduction laser power is changed by the amount specified by the scanning interval from the reproduction laser power set in the previous test reading, and then the following test reading is performed.

Here, there is a case where an optimum reproduction laser power fluctuates due to deformation of the super-resolution optical information recording medium, which deformation is caused by a change in the environment during the reproduction (e.g., a change in ambient temperature of the super-resolution optical information recording medium).

Even in such the case, according to the above arrangement, it is possible to perform the test readings with a scanning interval suitable for the individual super-resolution optical information recording medium, thereby reliably and efficiently determining an optimum reproduction laser power which is most suitable. This makes it possible to reproduce information from various super-resolution optical information recording media in a stable manner.

Note that the reproduction laser power may be changed in the test readings so as to be either increased or reduced.

By following this way, it is possible to perform the test readings efficiently. Further, in this way, it is possible to determine an optimum reproduction laser power quickly.

Thus, according to an optical information recording medium reproducing device and a super-resolution optical information recording medium of the present invention, it is possible to evaluate, by performing the test readings, how an index indicative of a reproduction signal quality (such as jitter) depends on a reproduction laser power, which dependence is characteristically observed in a super-resolution optical information recording medium storing information according to the random pattern system. This makes it possible to set a reproduction laser power with which optimum super-resolution reproduction can be performed, in reproduction of information from the super-resolution optical information recording medium. Thus, it is possible to set a reproduction laser power suitable for characteristics of an index relating to a reproduction quality of the individual super-resolution optical information recording medium, thereby enabling stable super-resolution reproduction.

Additional objects, features, and strengths of the present invention will be made clear by the description below. Further, the advantages of the present invention will be evident from the following explanation in reference to the drawings.

BRIEF DESCRIPTION OF DRAWINGS

FIG. 2 is an exemplary plan view of an optical information recording medium.

FIG. 8 is a graph showing how reproduction signal qualities exhibited by Discs #1 to #3 depended on reproduction laser powers.

REFERENCE SIGNS LIST

Figure 1:
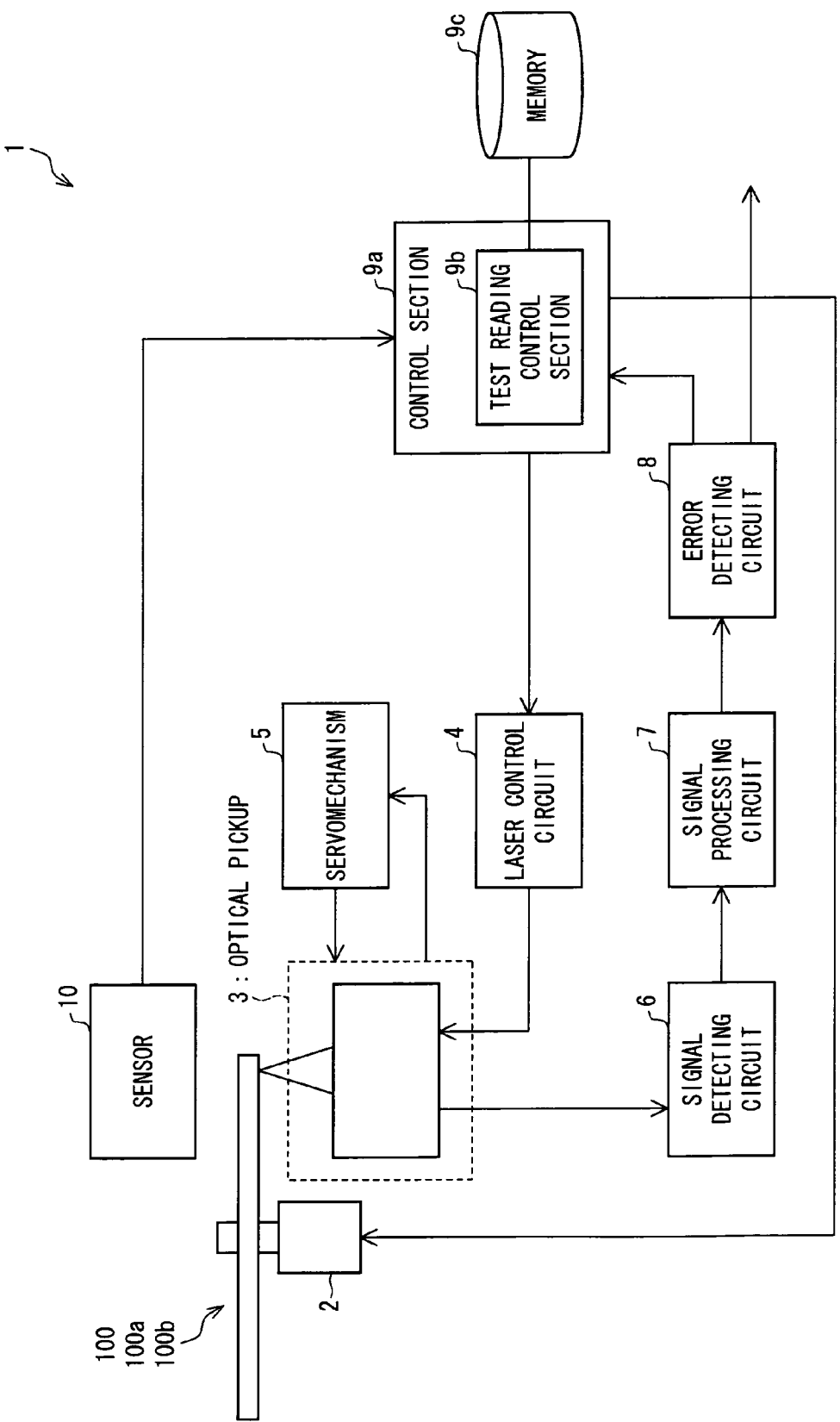
FIG. 1 is a functional block diagram showing an exemplary configuration of an optical information recording medium reproducing device which includes a test reading system of an embodiment of the present invention.

1 Optical information recording medium reproducing device
3 Optical pickup (optical system)
9a Control section
9b Test reading control section
71 Recording mark
100 Optical information recording medium
100a Super-resolution optical information recording medium
100b Ordinary optical information recording medium
101 Test reading information region
102 Data storage region

DESCRIPTION OF EMBODIMENTS

Figure 3:
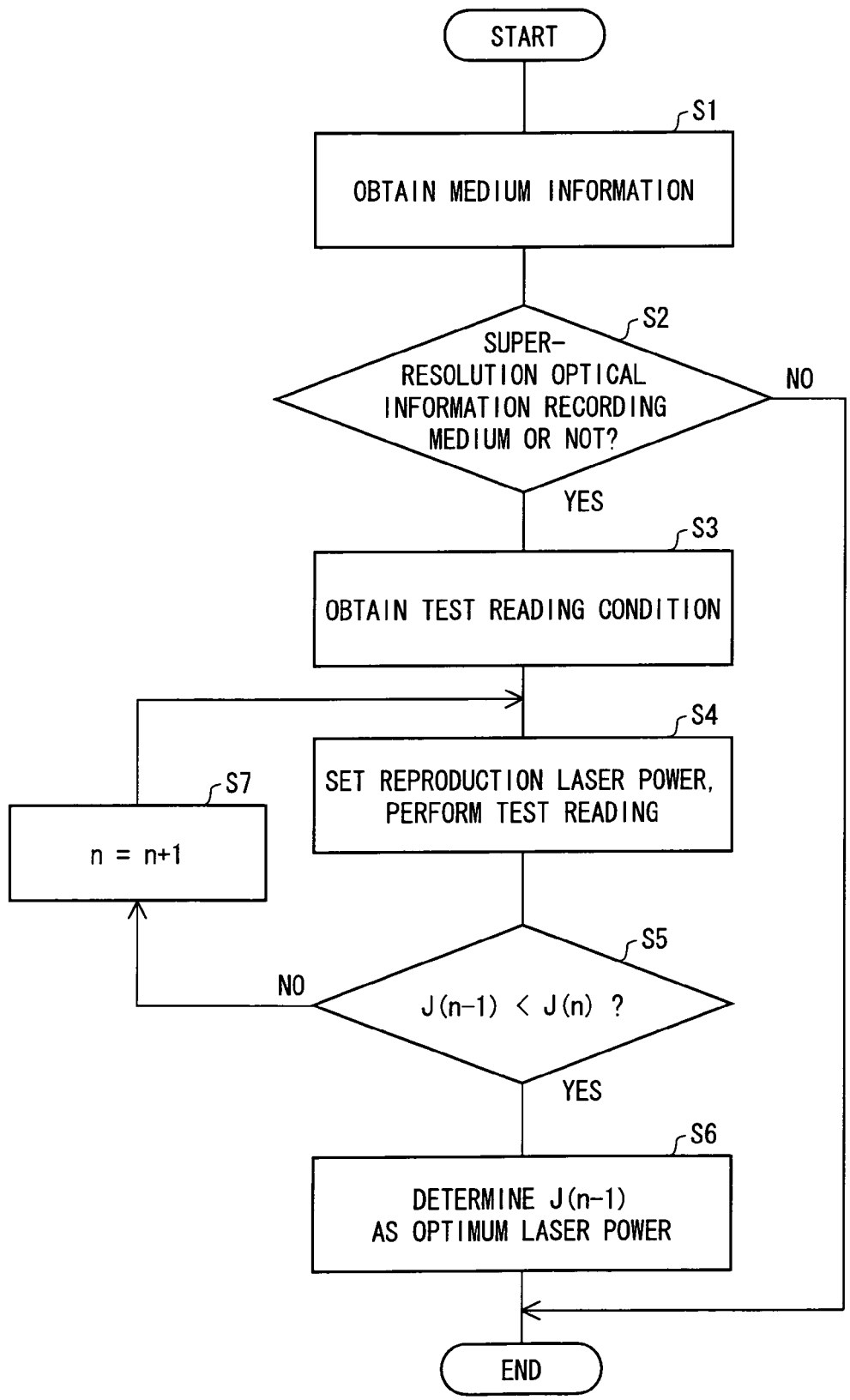
FIG. 3 is a flow chart showing how an optimum reproduction laser power is set through test readings.

The following describes an embodiment of the present invention with reference to FIGS. 1 through 3. An optical information recording medium reproducing device of the present embodiment reproduces information stored in super-resolution optical information recording media and ordinary optical information recording media.

(Configuration of Optical Information Recording Medium Reproducing Device)

First, an optical information recording medium reproducing device 1 of this embodiment will be described with reference to FIG. 1. FIG. 1 is a functional block diagram showing an exemplary configuration of the optical information recording medium reproducing device 1 which includes a test reading system. The optical information recording medium reproducing device 1 includes a spindle motor 2, an optical pickup 3, a laser control circuit 4, a servomechanism 5, a signal detecting circuit 6, a signal processing circuit 7, an error detecting circuit 8, a control section 9a, and a sensor 10 detecting an optical information recording medium which is set. The control section 9a is provided with a test reading control section 9b, which is a characteristic element of the optical information recording medium reproducing device 1. Further, a memory 9c is available via the test reading control section 9b.

The optical information recording medium reproducing device 1 is capable of optically reproducing information from an optical information recording medium 100. The optical information recording medium 100 may be, e.g., a super-resolution optical information recording medium 100a or an ordinary optical information recording medium 100b which does not need the super-resolution reproduction.

The spindle motor 2 is provided with a turntable (not illustrated) for rotating the optical information recording medium 100. While moving along a radius direction of the optical information recording medium 100, the optical pickup 3 emits a laser onto the optical information recording medium 100 which is rotating. By emitting laser light in this manner, the optical information recording medium reproducing device 1 reproduces information from the optical information recording medium 100.

The optical pickup 3 has the following function: In reproduction of the information stored in the optical information recording medium 100, the optical pickup 3 emits a reproduction laser onto the optical information recording medium 100, receives reflected light therefrom, and converts the reflected light into an electric signal for outputting it. The optical pickup 3 is provided with a semiconductor laser (not illustrated) serving as a light source, and is also provided with an objective lens (not illustrated). A wavelength of a laser emitted by the semiconductor laser is not particularly limited; for example, the wavelength may be 405 nm. A numerical aperture of the objective lens is not particularly limited; for example, the numerical aperture may be 0.85.

The laser control circuit 4 controls laser light emitted by the optical pickup 3.

Further, the laser control circuit 4 is designed to control, in reproduction of the information stored in the optical information recording medium 100, the optical pickup 3 so as to cause reproduction laser light to be emitted onto the optical information recording medium 100. Note that the electric signal generated by the optical pickup 3 in the reproduction is transmitted to the error detecting circuit 8 via the signal detecting circuit 6 and the signal processing circuit 7, and then is processed therein. Reproduction data thus obtained is transmitted to the control section 9a, and is then outputted. In a case where the optical information recording medium 100 is the super-resolution optical information recording medium 100a, test readings (described in detail later) are performed to optimize a reproduction laser power of reproduction laser light, and the optical pickup 3 emits the reproduction laser light onto the super-resolution optical information recording medium 100a. After that, an electric signal generated by the optical pickup 3 in the reproduction is transmitted to the error detecting circuit 8 via the signal detecting circuit 6 and the signal processing circuit 7, and then is processed therein. Subsequently, the information stored in the super-resolution optical information recording medium 100a is outputted.

The servomechanism 5 generates a focus error signal and a tracking error signal according the electric signal generated by the optical pickup 3, so as to control the movement of the optical pickup 3 along the radius direction.

The control section 9a is provided with the test reading control section 9b which controls a series of test readings. How the test readings are performed will be described in detail later. Assume that the optical information recording medium 100 here is the super-resolution optical information recording medium 100a. Note that, in reproduction of the ordinary optical information recording medium 100b, which is a non-super-resolution optical information recording medium, content may be reproduced according to an ordinary reproduction procedure. The ordinary optical information recording medium 100b includes a test reading information region 101 constituted by recording marks each formed to have a length equal to or longer than an optical system resolution limit of the optical information recording medium reproducing device 1, and therefore does not need the super-resolution reproduction. Based on this, it is possible to determine whether the optical information recording medium 100 is the super-resolution optical information recording medium 100a or the ordinary optical information recording medium 100b, without performing the super-resolution reproduction.

(Optical Information Recording Medium)

Next, the following describes the optical information recording medium 100 from which information is reproduced by the optical information recording medium reproducing device 1. FIG. 2 is an exemplary plan view of the optical information recording medium 100. As shown in FIG. 2, the optical information recording medium 100 has (i) an inner hole 103 and (ii) a test reading information region 101 disposed directly radially outside the inner hole 103. Further, the optical information recording medium 100 has a data storage region 102 disposed radially outside the test reading information region 101.

Specifically, test reading information stored in the test reading information region 101 includes, for example, medium identification information indicative of whether or not the optical information recording medium 100 is a super-resolution optical information recording medium, an address of a track position at which the test readings are to be performed, recommended reproduction laser power information and/or test reading start power information indicative of an initial value of a reproduction laser power for the test readings, and recommended scanning interval information indicative of a recommended scanning interval.

The information for determining whether or not the optical information recording medium 100 to be reproduced is a super-resolution optical information recording medium, the recommended reproduction laser power information and/or the test reading start power information, and the recommended scanning interval information are stored in the test reading information region 101 in advance, i.e., in a process of forming a substrate 70. In the present embodiment, the test reading information region 101 is formed in the process of forming the substrate 70. Alternatively, the test reading information region 101 may be formed at a desired timing after the substrate 70 is formed.

The test reading information region 101 is constituted by recording marks such as pits or wobbles. In a case where the test reading information region 101 is constituted by the pits, a plurality of pits including a recording mark longer than the optical system resolution limit of the optical information recording medium reproducing device 1 are positioned according to a predetermined system, so as to form recording marks indicative of the test reading information.

As a method for storing the test reading information, a system by which recording marks are formed according to a general system such as the 1-7PP modulation is employed. Note that a position of the test reading information region 101 storing the test reading information is not limited to the position shown in FIG. 2. Alternatively, the test reading information region 101 may be located in any desired position in the optical information recording medium 100.

Further alternatively, a plurality of test reading information regions 101 may be provided. Still further alternatively, a barcode specifying the test reading information may be formed in the vicinity of the inner hole 103 of the optical information recording medium 100.

Further, in a case where the test reading information is stored in the test reading information region 101 by pits which form protrusions and recesses and correspond to the test reading information, it is preferable that a size of each of these pits is equal to or longer than the light diffraction limit. That is, the test reading information is preferably stored according to a method which does not need the super-resolution reproduction. This allows the test reading information to be read out by an ordinary, predetermined reproduction laser power. A storage style of the test reading information only needs to allow the optical information recording medium reproducing device 1 to obtain the test reading information before a reproduction laser power for reproducing information stored in the optical information recording medium 100 is decided.

Note that, in a case where the optical information recording medium reproducing device 1 is connected with the Internet (including wire and wireless) network, the test reading information may be obtained via the network. Note also that the medium identification information may be stored according to the same method as that for storing the test reading information.

In a case where the optical information recording medium 100 is the super-resolution optical information recording medium 100a, recording marks formed on the data storage region 102 have lengths regularly different from each other, and include a recording mark shorter than the optical system resolution limit of the optical information recording medium reproducing device 1. Further, information is stored in the data storage region 102 by positioning these recording marks according to a predetermined system.

On the other hand, in a case where the optical information recording medium 100 is the ordinary optical information recording medium 100b, the data storage region 102 is constituted by recording marks each longer than the optical system resolution limit of the optical information recording medium reproducing device 1.

(Outline of Test Readings)

Next, the following describes the test reading system of the present invention, and states the necessity for the test readings. The test readings refer to a process for setting a reproduction laser power for optimizing a reproduction signal quality, in which process the test reading information (e.g., the jitter) is reproduced beforehand at a predetermined reproduction laser power so that an index for evaluating the reproduction signal quality is measured.

A specific method for performing the test readings is, for example, as follows: In order to reproduce information from the super-resolution optical information recording medium 100a, the optical information recording medium reproducing device 1 first obtains the test reading information including the recommended reproduction laser power information and/or the test reading start power information and the recommended scanning interval information. The test reading information may be stored in, e.g., a position which is not a recordable region of the super-resolution optical information recording medium 100a. Alternatively, the test reading information may be stored as a barcode in the vicinity of the inner hole 103 of the super-resolution optical information recording medium 100a. In either case, a storage style of the test reading information only needs to allow the optical information recording medium reproducing device 1 to obtain the test reading information before a reproduction laser power for content reproduction is decided.

Subsequently, according to the test reading information thus obtained, e.g., at a reproduction power specified by the test reading start power information, a test reading is performed to reproduce information for measuring the index for evaluation of a reproduction signal quality, and then the index is measured. The index measured here is jitter. However, the index to be measured for evaluation of the reproduction signal quality is not limited to the jitter, but may be any of other indexes (e.g., a bit error rate or asymmetry of a reproduction waveform). In many cases, the index such as the jitter is an index for evaluating a reproduction power margin (i.e., a margin for the reproduction signal quality with respect to a fluctuation in the reproduction laser power) of the super-resolution optical information recording medium 100a. For example, in the case where the jitter is used as the index, the reproduction power margin can be defined as a range of jitter values with which a reproduction laser power applied to the super-resolution optical information recording medium 100a does not cause a reading error in the reproduction system and does not make stable reproduction difficult.

Next, the reproduction laser power is increased by a value specified by the recommended scanning interval information, and reproduction is performed for measuring jitter (the recommended scanning interval information will be described later). That is, the reproduction laser power applied here has a value obtained by adding a laser power specified by the recommended scanning interval information to the laser power specified by the test reading start power information.

Thereafter, the process for increasing the reproduction laser power by the value set by the recommended scanning interval information and performing reproduction for measuring jitter is repeatedly performed. Consequently, a reproduction laser power is determined at which a lowest possible jitter is obtained even if the reproduction laser power fluctuates in some degree.

In the above description, the reproduction laser power is gradually increased from the value set by the test reading start power information. Conversely, the test readings may be performed by gradually reducing the reproduction laser power. Alternatively, the reproduction laser power may be fluctuated up and down around the recommended laser power in order to determine an optimum reproduction laser power.

The reason why the recommend laser power is not necessarily equal to the optimum reproduction laser power for the optical information recording medium reproducing device 1 is that there are variations in reproduction laser power among individual optical information recording medium reproducing devices.

Next, the following describes the reason why the recommended scanning interval information is necessary. The optical information recording media include: a super-resolution optical information recording medium having a large margin (hereinafter, referred to as "reproduction laser power margin") for a practical reproduction signal quality with respect to a fluctuation in the reproduction laser power; and a super-resolution optical information recording medium having a small reproduction laser power margin.

Firstly described is the reason why the test readings need to be performed prior to reproduction of content stored in the super-resolution optical information recording medium having a large reproduction laser power margin.

Such the super-resolution optical information recording medium has a large reproduction laser power margin; therefore, even if a fluctuation occurs in the reproduction laser power, the jitter is less affected by the fluctuation. For this reason, in the test readings for setting a reproduction laser power, a range to be subjected to the test readings is quite large. In view of this, in order to perform the test readings in an efficient manner, the test readings should be performed under the condition that (i) the setting of the test reading start power information has been changed according to characteristics of the optical information recording medium and (ii) the recommended scanning interval information has been set appropriately. Thus, by (i) setting an appropriate value for the test reading start power information and (ii) appropriately increasing a change amount of the reproduction laser power which change amount is represented by the recommended scanning interval information power, it is possible to reduce the number of measuring points for the index (e.g., jitter) indicative of a reproduction signal quality. Further, even in a case where the test reading start power varies due to errors among individual optical information recording medium reproducing devices, it is possible to satisfactorily determine an optimum reproduction laser power thanks to the setting of the recommended scanning interval information. That is, by setting the recommended scanning interval information appropriately, it is possible to determine an optimum reproduction laser power in an efficient manner.

Next, the following describes the reason why the test readings need to be performed prior to reproduction of content stored in the super-resolution optical information recording medium having a small reproduction laser power margin. In this case, if the test readings are performed with the same recommended scanning interval as in the case of the super-resolution optical information recording medium having a large reproduction laser power margin for the jitter exhibited by this medium, it is difficult to set a suitable reproduction laser power for the super-resolution optical information recording medium having a small reproduction laser power margin for jitter because of its very small reproduction laser power margin.

However, if the change amount (recommended scanning interval information) of the reproduction laser power from the test reading start point is set so as to be appropriately smaller, it is possible to determine an optimum reproduction laser power all the time. This is because that, due to the small reproduction laser power margin for jitter measured at reproduction of information from the super-resolution optical information recording medium 100a, a range of reproduction laser powers within which a practical jitter value is obtained is also small. Therefore, the test readings should be performed with a reproduction laser power change amount (recommended scanning interval information) suitably set according to the reproduction laser power margin for jitter.

(Details of Test Readings)

Next, how the test reading system operates will be described with reference to FIGS. 1, 2, and 3. Here, assume that the optical information recording medium 100 from which information is to be reproduced by the optical information recording medium reproducing device 1 is the super-resolution optical information recording medium 100a. FIG. 3 is a flow chart showing how an optimum reproduction laser power is set through the test readings.

When the super-resolution optical information recording medium 100a is set in the optical information recording medium reproducing device 1, the super-resolution optical information recording medium 100a is detected by the sensor 10, and then the control section 9a causes the spindle motor 2 to operate for rotating the super-resolution optical information recording medium 100a.

The control section 9a causes, via the laser control circuit 4, the optical pickup to move to a position above the test reading information region 101 of the optical information recording medium 100a, so that the medium identification information is read out (S1). Then, according to the medium identification information, the test reading control section 9b determines whether or not the super-resolution optical information recording medium 100a from which information is to be reproduced is an optical information recording medium which needs the super-resolution reproduction (S2). This determination may be made by e.g., judgment of an identifier for medium identification which identifier is stored in the medium identification information. Here, it is determined that the super-resolution optical information recording medium 100a is the optical information recording medium which needs the super-resolution reproduction (YES in S2). Then, the test reading control section 9b reads out the test reading information so as to obtain a test reading condition (S3). This test reading information passes through the signal detecting circuit 6, the signal processing circuit 7, and the error detecting circuit 8, and then is stored in the memory 9c by the test reading control section 9b.

The test reading control section 9b causes the optical pickup 3 to move to a position above an address of a track position at which test readings are to be performed. The region at which the test readings are to be performed only needs to be a region in which information is stored by positioning a plurality of recording marks according to a predetermined system, the plurality of recording marks having length regularly different from each other and including a recording mark shorter than the optical system resolution limit of the optical information recording medium reproducing device 1. For example, this region may be the data storage region 102.

Subsequently, the test reading control section 9b sets a reproduction laser power for a test reading, and performs the test reading (S4). The test reading control section 9b causes, via the laser control circuit 4, the optical pickup 3 to emit laser light onto the super-resolution optical information recording medium 100a at the reproduction laser power thus set. During this reproduction, the optical pickup 3 generates an electric signal, which is then transmitted to the error detecting circuit 8 via the signal detecting circuit 6 and the signal processing circuit 7. Thus, jitter is measured.

Here, assume that a jitter value measured at the nth test reading is "J(n)" (n=1, 2, . . . ). Accordingly, a jitter value measured at the n−1 th test reading is represented by "J(n−1)". For convenience, assume that "n" for the first measurement performed according to the test reading start power information is "1" (n=1). A reproduction laser power applied at this time is the reproduction laser power specified by the test reading start power information.

Further, assume that "n" for a test reading performed immediately after the first test reading is "2" (n=2). At this time, the reproduction laser power specified by the test reading start power information is changed by a reproduction laser power specified by the recommended scanning interval information, and the reproduction laser power thus changed is applied. During the test readings, the reproduction laser power may be changed so as to be increased, or, conversely, to be reduced.

The jitter measured as above is stored in the memory 9c by the above-described test reading control section 9b. In the present embodiment, the test reading control section 9b and the memory 9c are connected with each other; however, the present invention is not limited to this. That is, a position in which the memory 9c is positioned may optionally be determined according to the form realizing the present invention. For example, the following arrangement is also possible: The memory 9c is configured so as to be connected with the control section 9a, and to be usable both by the control section 9a and the test reading control section 9b.

Next, the test reading control section 9b compares (i) the jitter thus measured with (ii) a jitter measured just before this test reading to determine which is larger (S5). That is, a determination formula "J(n−1)<J(n)" is evaluated. If this condition is not satisfied, "n" is incremented (S7), and then another test reading is performed (S4). That is, the test reading control section 9b causes, via the laser control circuit 4, the optical pickup 3 to increase the reproduction laser power by the amount specified by the recommended scanning interval information. Then, jitter is measured in the same manner as above.

Generally, a series of the steps for the test reading is performed a plurality of times. Through this, a reproduction laser power at which favorable jitter is obtained is detected at the end (YES is S5).

Consequently, the reproduction laser power at which the jitter "J(n−1)" is given is set as the optimum reproduction laser power for reproducing content stored in the optical information recording medium 100 (S6). Then, the process for the test readings is ended. If it is determined, according to the medium identification information obtained in S1, that the optical information recording medium 100 from which information is to be reproduced by the optical information recording medium reproducing device 1 is the ordinary optical information recording medium 100*b* which does not need the super-resolution reproduction (NO in S2), the process ends without the test reading control section 9*b* performing a test reading, and the information in the optical information recording medium 100*b* is reproduced according to a conventional method.

As a result, the optical information recording medium reproducing device 1 can reproduce the information from the data storage region in the optical information recording medium 100 with the optimum reproduction laser power, and accordingly can reproduce the content with a favorable reproduction quality.

Note that a storage style of the test reading information only needs to allow the optical information recording medium reproducing device 1 to obtain the test reading information without performing the super-resolution reproduction. Further, in a case where the optical information recording medium 100 is not a super-resolution optical information recording medium (i.e., in a case where the optical information recording medium 100 is the ordinary optical information recording medium 100*b*), the test reading control section 9*b* may reproduce the information stored in the ordinary optical information recording medium 100*b* according to conventional means.

EXAMPLES

Next, the super-resolution optical information recording medium 100*a* from which information is to be reproduced by the optical information recording medium reproducing device 1 of the present embodiment will be described. Taking Discs #1 to #3 as examples, the following explains that a degree of how much a reproduction signal quality exhibited by a super-resolution optical information recording medium depends on a reproduction laser power (reproduction laser power margin) varies with the configuration of the super-resolution optical information recording medium. First, basic configurations of these super-resolution optical information recording media 100*a* will be described. The description herein deals with optical information recording media each employing the super-resolution optical information recording medium technique of the present examples. Note that each of Discs #1 to #3 described below is based on the configuration of the above-described super-resolution optical information recording medium 100*a*.

[Disc #1]

Figure 4:
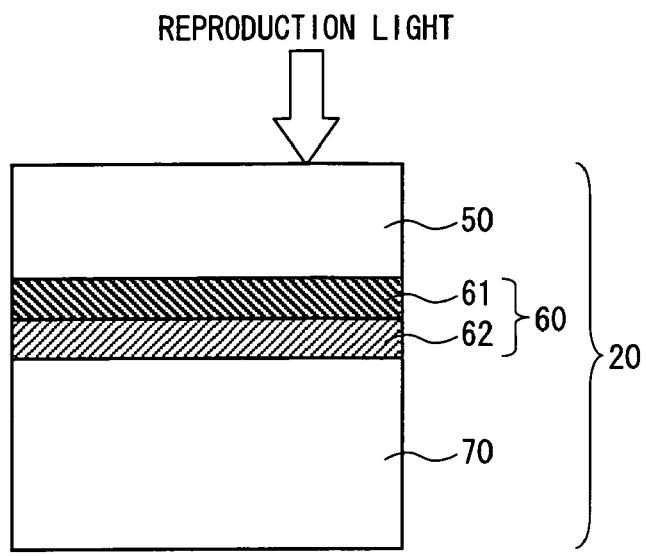
FIG. 4 is a cross-section view schematically showing a configuration of an optical information recording medium relating to Disc # 1.

FIG. 4 is a cross-section view schematically showing a configuration of an optical information recording medium 20 relating to Disc #1. As shown in FIG. 4, Disc #1 includes a light-transmitting layer 50, a thin film section 60, and a substrate 70, which are formed in this order from a side from which reproduction light enters. The light-transmitting layer 50 includes a polycarbonate film (not illustrated) (film thickness: 80 μm) and a transparent adhesive layer (not illustrated) (film thickness: 20 μm), which are formed in this order from the side from which reproduction light enters. The thin film section 60 includes a reproduction layer 61 (film thickness: 111 nm) made of zinc oxide and a light absorbing layer 62 (film thickness: 50 nm) made of Ge, which are formed in this order from the side from which reproduction light enters. The substrate 70 is made of a polyolefin resin.

A material of the light-transmitting layer 50 only needs to be allow adequate transmission of reproduction light. For example, the light-transmitting layer 50 is made of a polycarbonate film, an ultraviolet ray curing resin, or the like.

[Disc #2]

Figure 5:
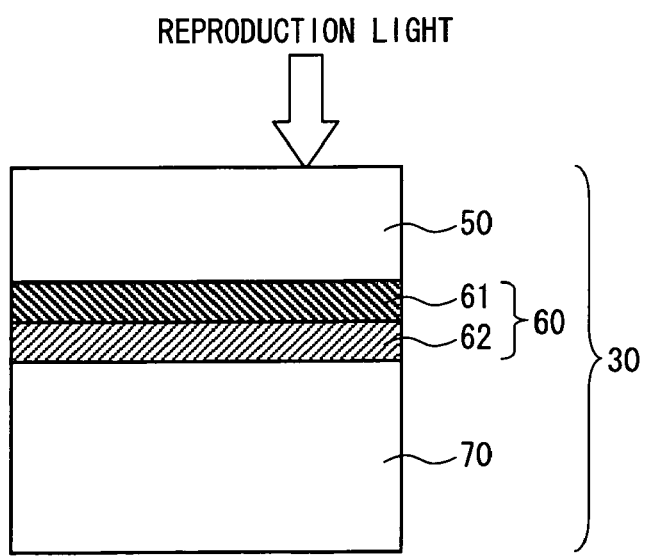
FIG. 5 is a cross-section view schematically showing a configuration of an optical information recording medium relating to Disc #2.

FIG. 5 is a cross-section view schematically showing a configuration of an optical information recording medium 30 relating to Disc #2. As shown in FIG. 5, Disc #2 has a configuration similar to that of Disc #1. However, a film thickness of a reproduction layer 61 is set to 120 nm or greater, which is greater than that of the reproduction layer 61 of Disc #1.

[Disc #3]

Figure 6:
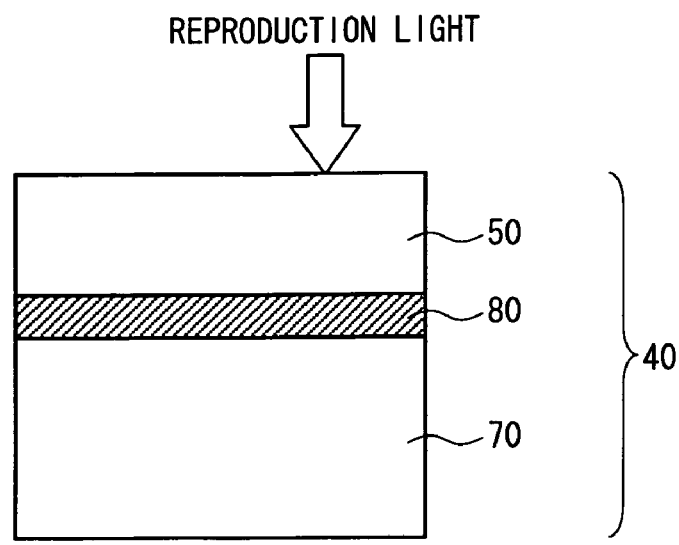
FIG. 6 is a cross-section view schematically showing a configuration of an optical information recording medium relating to Disc #3.

FIG. 6 is a cross-section view schematically showing a configuration of an optical information recording medium 40 relating to Disc #3. As shown in FIG. 6, Disc #3 has a configuration corresponding to that of the super-resolution optical information recording medium described in Patent Literature 2. Disc #3 includes a light-transmitting layer 50, a thin film like section 80, and a substrate 70, which are formed in this order from a side from which reproduction light enters.

In Disc #3, the light-transmitting layer 50 includes a polycarbonate film (not illustrated) (film thickness: 80 μm) and a transparent adhesive layer (not illustrated) (film thickness: 20 μm), which are formed in this order from the side from which reproduction light enters. The thin film like section 80, which is made of Au, has a film thickness of 50 nm. The substrate 70 is made of a polyolefin resin.

Figure 7:
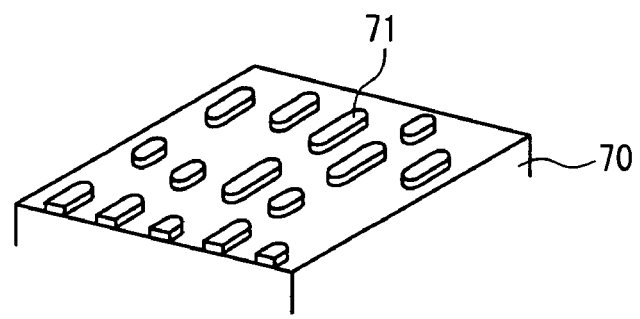
FIG. 7 is a view showing exemplary recording marks to be formed on a substrate of each of the optical information recording media.

Here, the following describes recording marks to be formed on each substrate 70 of the optical information recording media 20, 30, and 40. FIG. 7 is a view showing exemplary recording marks to be formed on each substrate 70 of these optical information recording media. As shown in FIG. 7, each substrate 70 of the optical information recording media 20, 30, and 40, respectively relating to Discs #1, #2, and #3, includes (i) recording marks each having a length equal to or shorter than the light diffraction limit and (ii) recording marks each having a length equal to or longer than the light diffraction limit. Further, on each substrate 70, prepits (pits) 71 forming protrusions and recesses and specifying recording information according to the random pattern system are concentrically or spirally formed. An optical property of a material forming each substrate 70 is not particularly limited, and the material may be transparent or nontransparent. Examples of the material forming each substrate 70 encompass: glass; thermoplastic transparent resins such as polycarbonate, amorphous polyolefin, thermoplastic polyimide, PET (polyethylene terephthalate), PEN (polyethylene naphthalate), and PES (polyethersulfone); thermosetting transparent resins such as thermosetting polyimide and an ultraviolet ray curing acrylic resin; a metal; and combinations thereof.

Next, with reference to FIG. 8 showing how reproduction signal qualities exhibited by Discs #1 to #3 depended on reproduction laser powers (reproduction laser power margins), the following explains the necessity for the test reading system of the present invention in reproduction of information from a super-resolution optical information recording medium. Note that, in order to reproduce information from these super-resolution optical information recording media, the 1-7PP modulation was used, and the reproduction optical system used optical reading employed in Blu-ray (Registered Trademark). Further, after a signal was processed by a limit equalizer, jitter was evaluated as a reproduction signal quality.

For Disc #1, the jitter did not change until the reproduction laser power reached a value in the vicinity of 0.8 mW; however, the jitter became worse when the reproduction laser power had a value of 1 mW or higher. For Disc #2, the jitter had a minimum value when the reproduction laser power had a value in the vicinity of 1.6 mW. The configuration of Disc #3 corresponds to that of the super-resolution optical information recording medium described in Patent Literature 2. The jitter exhibited by Disc #3 did not depend on the reproduction laser power.

In this manner, the super-resolution optical information recording media having various configurations were measured for how much jitter depended on a reproduction laser power. As a result, it was found that there were various reproduction laser power margins depending on the configuration of the super-resolution optical information recording medium. Therefore, in order to reproduce information from super-resolution optical information recording media in a stable manner, it is necessary to set a reproduction laser power suitable for the individual super-resolution optical information recording medium.

Now, if a period of time necessary for setting a reproduction laser power suitable for the individual super-resolution optical information recording medium is long, it takes time until information stored in the optical information recording medium 100 is reproduced. In order to avoid this, it is necessary to set an optimum reproduction laser power in an efficient manner. Therefore, the test readings should be performed in the later-described manner in order to set an optimum reproduction laser power.

Here, the test reading system will be described, which is a characteristic system of the optical information recording medium reproducing device 1 of the present invention. The control section 9a shown in FIG. 1 is provided with the test reading control section 9b which controls a series of the test readings. Details of how the test readings are performed will be described later. Assume that the optical information recording medium described here is a super-resolution optical information recording medium. Note that, in a case of a non-super-resolution optical information recording medium, content may be reproduced according to an ordinary reproduction procedure. The non-super-resolution optical information recording medium includes a test reading information region constituted by recording marks each formed to have a length equal to or longer than the optical system resolution limit of the optical information recording medium reproducing device 1, and accordingly does not need the super-resolution reproduction. Based on this, it is possible to determine whether the optical information recording medium is the super-resolution optical information recording medium or the ordinary optical information recording medium, without performing the super-resolution reproduction.

EXAMPLES OF TEST READINGS FOR EACH DISC

Next, the following describes cases where the process described with reference to the flow chart showing how an optimum reproduction laser power is set is applied to Discs #1 to #3. As described previously, Discs #1 to #3 are all super-resolution optical information recording media.

[Test Readings for Disc #2]

As shown in FIG. 8, Disc #2 is an example of such the super-resolution optical information recording medium that strongly depended on a reproduction laser power while the reproduction laser power ranged from 1.0 mW to 1.8 mW within which jitter obtained a favorable value. That is, it is necessary to set an optimum reproduction laser power to a value in the vicinity of 1.6 mW, at which the jitter obtains a minimum value. Through the test readings for such the super-resolution optical information recording medium, it is possible to set, according to the previously-described setting method, the optimum reproduction laser power as below:

In a case where the optical information recording medium reproducing device 1 obtains the test reading start power information and the recommended scanning interval information, the test readings are performed, for example, in the following manner, so that the optimum reproduction laser power is set.

For example, assume that the test reading start power information is set to 1.0 mW, and the recommended scanning interval information is set to 0.1 mW. Under this condition, the test reading control section 9b starts a test reading. Assume that a jitter value measured by the test reading control section 9b at the nth test reading is "$J(n)$" ($n=1, 2, \ldots$) (S4). Then, the test reading control section 9b compares (i) the jitter thus measured with (ii) jitter measured just before the nth test reading to determine which is larger (S5). Consequently, the test reading control section 9b sets, as the optimum reproduction laser power, a reproduction laser power at which the jitter "$J(n-1)$" is given which satisfies the determination formula "$J(n-1)<J(n)$" (S6).

Under the above condition, when the test reading is performed eight times, i.e., in a case of "$n=8$", the above determination formula is satisfied, and the optimum reproduction laser power is decided. The optimum reproduction laser power is represented as follows: $J(7)=1.6$ mW. Accordingly, the test reading control section 9b sets the optimum reproduction laser power to 1.6 mW. By performing the test readings for a super-resolution optical information recording medium in this manner, it is possible to determine an optimum reproduction laser power. This makes it possible to reproduce information from a super-resolution optical information recording medium in a stable manner, with a favorable reproduction signal quality.

Next, the following describes that, unlike the above-described setting method, if a series of the test readings is performed without the recommended scanning interval information properly set, there is a possibility that an optimum reproduction laser power cannot be set. Assume that the test reading start power information is set to 1.0 mW, and the recommended scanning interval information is set to 0.4 mW. This recommended scanning interval information is four times greater than the setting of the recommended scanning interval information in the above-described setting method. In this case, there is no "n" satisfying the formula "$J(n-1)<J(n)$". That is, "n" at which jitter obtains a minimum value does not exist; therefore, it is impossible to set the optimum reproduction laser power. Also, in a case where the test reading start power information is set to 1.6 mW and the recommended scanning interval information is set to 0.4 mW, "n" at which the jitter obtains a minimum value does not exists, either. That is, it is impossible to set an optimum reproduction laser power.

Here, even for a super-resolution optical information recording medium having a reproduction laser power margin smaller than that of the optical information recording medium 30 relating to Disc #2, it is possible to set an optimum reproduction laser power by performing the test readings under the condition that the test reading start power information and the recommended scanning interval information are properly set. That is to say, in the test readings for the optical information recording medium 30 relating to Disc #2, which is an exemplary super-resolution optical information recording medium, it is important to set appropriate recommended scanning interval information.

Now, the following describes that, if a series of the test readings is performed without the test reading start power information properly set, there is a possibility that an optimum reproduction laser power cannot be set in an efficient manner. Assume that the test reading start power information is set to 0.5 mW, and the recommended scanning interval information is set to 0.1 mW. In this case, setting of the reproduction laser power information at n=12 is determined as the optimum reproduction laser power. Thus, these test readings take approximately two times as long as the test readings performed with the test reading start power information set to 1.0 mW. These test readings cannot be efficient.

Thus, by performing the test readings for a super-resolution optical information recording medium with the recommended scanning interval information suitably set for the medium, it is possible to reliably and efficiently determine an optimum reproduction laser power. This makes it possible to reproduce information from various super-resolution optical information recording media in a suitable manner.

[Test Readings for Disc #1]

Next, the following describes an example of operation for setting an optimum reproduction laser power for Disc #1 shown in FIG. 8. The jitter did not depend on the reproduction laser power while the reproduction laser power ranged from 0.4 mW to 0.8 mW; however, the jitter suddenly became worse when the reproduction laser power had a value in the vicinity of 1.0 mW. Thus, for some super-resolution optical information recording media, jitter changes according to the reproduction laser power. In order to reproduce, with a favorable reproduction signal quality, information from such the super-resolution optical information recording medium, it is necessary to secure a reproduction laser power margin. Further, it is also necessary to set the optimum reproduction laser power to be within a range from 0.4 mW to 0.8 mW. Through the test readings for such the super-resolution optical information recording medium, it is possible to set the optimum reproduction laser power, for example, as follows:

Similarly to the case of the above-described Disc #2, the following describes, with reference to the flow chart shown in FIG. 3, specific operation for setting an optimum reproduction laser power through the test readings. Since the test readings are required (after 51, YES in S2), the address of the track position, the recommended reproduction laser power information and/or the test reading start power information, and the recommended scanning interval information are read out (S3). Here, assume that, as a result of the reading-out, the test reading start power information is set to 0.4 mW, and the recommended scanning interval information is set to 0.4 mW, for example. Under this condition, the test reading control section 9b starts a test reading. Assume that a jitter value measured at the nth test reading is J(n) (n=1, 2, . . . ) (S4). Then, the test reading control section 9b compares (i) the jitter thus measured with (ii) jitter measured just before the nth test reading to determine which is larger (S5). Consequently, the test reading control section 9b sets, as the optimum reproduction laser power, a reproduction laser power at which the jitter "J(n)" is given which satisfies "J(n−1)<J(n)" (S6). In this case, at n=3, the optimum reproduction laser power is decided. That is, J(2)=0.8 mW is set as the optimum reproduction laser power. Accordingly, the test reading control section 9b sets the optimum reproduction laser power to 0.8 mW.

Thus, by performing the test readings for the super-resolution optical information recording medium 100a, it is possible to determine an optimum reproduction laser power. This makes it possible to reproduce information from the super-resolution optical information recording medium in a stable manner, with a favorable reproduction signal quality.

Next, the following describes that, unlike the above-described setting method, if a series of the test readings is performed without the recommended scanning interval information properly set, there is a possibility that the series of the test readings cannot be performed in an efficient manner. Assume that the test reading start power information is set to 0.4 mW as well as in the above-described setting method, and the recommended scanning interval information is set to 0.1 mW. This recommended scanning interval information is one-fourth of the setting of the recommended scanning interval information in the above-described setting method. In this case, "n" satisfying "J(n−1)<J(n)" is 6 (n=6). At this time, an optimum reproduction laser power to be set is 0.8 mW. Thus, it is possible to set the optimum reproduction laser power to the same value as that set in the case where the recommended scanning interval information is set to 0.4 mW.

However, in the case where the test readings are performed with the recommended scanning interval of 0.4 mW, the optimum reproduction laser power can be set at the third test reading (n=3); on the other hand, in the case where the recommended scanning interval information is set to 0.1 mW as this time, the optimum reproduction laser power is set at the sixth test reading (n=6). This means that the test readings performed in this case take two times as long as the test readings performed with the recommended scanning interval of 0.4 mW. These test readings cannot be efficient. In view of this, it is necessary to set appropriate recommended scanning interval information for the individual super-resolution optical information recording medium.

Thus, by performing the test readings with the recommended scanning interval information suitably set for the individual super-resolution optical information recording medium, it is possible to reliably and efficiently determine an optimum reproduction laser power. This makes it possible to reproduce information from various super-resolution optical information recording media in a suitable manner.

[Test Readings for Disc #3]

Next, the following describes a case where an optimum reproduction laser power is set for Disc #3 shown in FIG. 8.

The optimum reproduction laser power for Disc #3 can be set in the same setting manner as described for Discs #1 and #2. Here, the test readings are performed with the test reading start power information set to 0.3 mW and the recommended scanning interval information set to 0.1 mW. As a result, the optimum reproduction laser power can be set to 0.5 mW.

Note that, in a case of a medium, such as Disc #3, having a large margin (reproduction laser power margin) for practical jitter with respect to a fluctuation in a reproduction laser power, or in a case where a margin (reproduction laser power margin) for practical jitter with respect to a fluctuation in a reproduction laser power does not change according to the environment surrounding the super-resolution optical information recording medium, an optimum reproduction laser power can be set as follows:

For example, the optical information recording medium reproducing device 1 obtains the recommended reproduction laser power information only. In this case, specifically, the following two flows are possible, for example:

(i) Upon obtaining the recommended reproduction laser power, a reproduction laser power is continuously fluctuated up and down around the recommended laser power. Then, a reproduction laser power at which jitter obtains a lowest value is set as the optimum reproduction laser power.

(ii) Upon obtaining the recommended reproduction laser power information, the recommended laser power is set as the optimum reproduction laser power, and content is reproduced with the optimum reproduction laser power.

The way in which the reproduction laser power is changed and the optimum reproduction laser power is set in the test readings are not limited to the above methods. The test readings can be performed according to information (such as the address of the track position, the recommended reproduction laser power information and/or the test reading start power information, and the recommended scanning interval information) included in the test reading information, and by combining these items of the information. The way in which the reproduction laser power is changed and the optimum reproduction laser power is set in the test readings only needs to be capable of setting, at the end, an optimum reproduction laser power with which reproduction can be performed with a favorable reproduction signal quality.

For example, there may be a case where the optical information recording medium reproducing device 1 obtains, from the test reading information region 101 of the super-resolution optical information recording medium 100a, the recommended reproduction laser power information, the test reading start power information, and the recommended scanning interval information. In this case, the optical information recording medium reproducing device 1 may select one of the following methods: the previously-described method for setting an optimum reproduction laser power by performing the test readings using the test reading start power information and the recommended scanning interval information; and a method (corresponding to the above-described methods (i) and (ii)) for setting an optimum reproduction laser power using the recommended reproduction laser power information only. Alternatively, the test readings may be performed by combining these methods so that an optimum reproduction laser power is set.

Variation Example

The above-described items of the test reading information are preferably stored in the test reading information region 101 with recording marks each longer than the optical system resolution limit of the optical information recording medium reproducing device 1. These recording marks are formed in the test reading information region 101 in a process of forming the substrate 70. The recording marks are formed with use of e.g., pits or wobbles. In a case where the recording marks are formed by the pits, the test reading information is stored by positioning a plurality of pits according to a predetermined system, the plurality of pits including recording marks each longer than the optical system resolution limit of the optical information recording medium reproducing device.

As a method for storing the test reading information, a system by which recording marks are formed according to a general system such as the 1-7PP modulation is employed. However, the present invention is not limited to such the system.

As described above, by storing the test reading information with the recording marks each longer than the optical system resolution limit, it is possible to determine whether or not an optical information recording medium from which information is to be reproduced is a super-resolution optical information recording medium, and to obtain the recommended reproduction laser power information and/or the test reading start power information and the recommended scanning interval information, without performing the super-resolution reproduction. This makes it possible to obtain the test reading information even if the medium from which information is to be reproduced is a ROM (Read Only Memory) type, write-once type, or rewritable optical information recording medium. Therefore, it is possible to reproduce information from various kinds of optical information recording media in a stable manner, regardless of whether or not the subject optical information recording medium is a super-resolution optical information recording medium. This allows the optical information recording medium reproducing device to have compatibility with a wider variety of optical information recording media.

Further, since it is possible to perform reproduction with a reproduction laser power optimum for the individual super-resolution optical information recording medium, it is possible to prevent the optical information recording medium 100 from e.g., deteriorating due to irradiation of a reproduction laser having an excessive laser power, thereby improving durability against repeated reproduction. This also elongates a life of a reproduction laser element in the optical information recording medium reproducing device 1.

In addition, it is possible to ensure a favorable reproduction signal quality, by performing the test readings according to a margin (reproduction laser power margin) for practical jitter or the like exhibited by the super-resolution optical information recording medium 100a with respect to a fluctuation in a reproduction laser power. This makes it possible to reproduce information from various super-resolution optical information recording media in a stable manner regardless of their types, thereby allowing the optical information recording medium reproducing device to have compatibility with a wider variety of super-resolution optical information recording media.

Here, the index to be used in the test readings for evaluation of a reproduction signal quality is not limited to the jitter, but may be e.g., a bit error rate. For example, in a case where the bit error rate is used as the index, the reproduction power margin can be defined as a range of bit error rate values with which a reproduction laser power applied to the super-resolution optical information recording medium 100a does not cause a reading error in the reproduction system and does not make stable reproduction difficult.

Moreover, since it is possible to perform the test readings with the recommended scanning interval information suitably set for a property of the individual super-resolution optical information recording medium, an optimum reproduction laser power can be reliably and efficiently determined so that it becomes most suitable. This makes it possible to reproduce information from various super-resolution optical information recording media in a stable manner.

What is more, since reproduction can be performed with a reproduction laser power optimum for the individual super-resolution optical information recording medium, it is possible to prevent the optical information recording medium from e.g., deteriorating due to application of a reproduction laser power having an excessive laser power, thereby improving durability against repeated reproduction. This also elongates a life of a reproduction laser element in the optical information recording medium reproducing device 1.

Additionally, it is possible to ensure a reproduction signal quality, by performing the test readings according to a margin (reproduction laser power margin) for practical jitter or the like with respect to a fluctuation in a reproduction laser power, the jitter or the like being generated during reproduction of information from the super-resolution optical information recording medium 100a. This makes it possible to reproduce information from various super-resolution optical information recording media in a stable manner regardless of their types, thereby allowing the optical information recording medium reproducing device 1 to have compatibility with a wider variety of optical information recording media 100.

Further, it is possible to realize the present invention as follows:

(1) A reproducing device for reproducing content information from a super-resolution optical information recording medium, the content information being stored in the super-resolution optical information recording medium by positioning a plurality of marks according to a predetermined system, the plurality of marks having lengths regularly different from each other and including a mark shorter than an optical system resolution limit of the reproducing device, the super-resolution optical information recording medium storing recommended reproduction laser power information and/or test reading start power information and recommended scanning interval information, each of which is for reproducing the content information, the reproducing device including: a system for determining a reproduction laser power by performing a plurality of test readings according to the recommended reproduction laser power information or the test reading start power information and the recommended scanning interval information, in the reproduction of the content information from the super-resolution optical information recording medium.

(2) A method for reproducing content information from a super-resolution optical information recording medium, the content information being stored in the super-resolution optical information recording medium by positioning a plurality of marks according to a predetermined system, the plurality of marks having lengths regularly different from each other and including a mark shorter than an optical system resolution limit of a reproducing device, the super-resolution optical information recording medium storing recommended reproduction laser power information and/or test reading start power information and recommended scanning interval information, each of which is for reproducing the content information, the method including the step of: performing, in the reproduction of the content information from the super-resolution optical information recording medium, a plurality of test readings according to the recommended reproduction laser power information or the test reading start power information and the recommended scanning interval information, in order to determine a reproduction laser power.

(3) An optical information recording medium, including: a data storage region having content information stored therein by positioning a plurality of marks according to a predetermined system, the plurality of marks having lengths regularly different from each other and including a mark shorter than an optical system resolution limit of a reproducing device; and a test reading information region storing recommended reproduction laser power information and/or test reading start power information and recommended scanning interval information, each of which is for reproducing the content information, the test reading information region being constituted by marks each formed to have a length equal to or longer than the optical system resolution limit of the reproducing device.

(4) An optical information recording medium, including: a data storage region having content stored therein by a plurality of marks formed according to a predetermined system, the plurality of marks having lengths regularly different from each other and including a mark shorter than an optical system resolution limit of a reproducing device; and a test reading information region storing recommended reproduction laser power information and/or test reading start power information and recommended scanning interval information, each of which is for reproducing the content, the test reading information region being constituted by marks each formed to have a length equal to or longer than the optical system resolution limit of the reproducing device.

Thus, an optical information recording medium reproducing device of the present invention is for reproducing information from an optical information recording medium, the optical information recording medium having the information stored therein by positioning a plurality of marks according to a predetermined system, the plurality of marks having lengths regularly different from each other and including a mark shorter than an optical system resolution limit of the optical information recording medium reproducing device, the optical information recording medium reproducing device performing, by emission of laser light, a plurality of test readings each measuring an index relating to a reproduction quality of the optical information recording medium, in order to set, according to the indexes measured, a reproduction laser power for reproducing the information, the plurality of test readings being performed while a reproduction laser power is changed from a predetermined initial value.

Here, among super-resolution optical information recording media, there is a super-resolution optical information recording medium for which a reproduction laser power and a reproduction quality are correlated with each other. Note that this super-resolution optical information recording medium employs a so-called random pattern system, by which a plurality of marks having lengths regularly different from each other are positioned according to a predetermined system along a direction in which signal reproduction is performed.

With the above arrangement, in reproduction of the information from the super-resolution optical information recording medium, the optical information recording medium reproducing device performs the test readings in order to set the reproduction laser power optimum for reproduction of the information from the optical information recording medium. Then, according to the indexes each relating to the reproduction quality which indexes have been obtained as a result of the test readings, the reproduction laser power is determined. Thus, it is possible to determine the reproduction laser power favorable for reproduction of the information from the optical information recording medium, thereby achieving an excellent reproduction quality.

Further, it is possible to reproduce the information from the optical information recording medium without emitting an unnecessarily large reproduction laser power onto a storage surface of the optical information recording medium. This prevents deterioration and the like of a reproduction quality of the optical information recording medium as a medium, thereby improving durability against repeated reproduction.

Here, the predetermined initial value is set as the reproduction laser power for performing the first test reading, and then the first test reading is started. The predetermined initial value refers to, for example, a reproduction laser power suitable for reproduction of information from the optical information recording medium which reproduction laser power has been obtained in advance by e.g., measurement under a standard condition.

In a case of an optical information recording medium having a large margin (reproduction laser power margin) for a practical reproduction signal quality with respect to a fluctuation in a reproduction laser power, or in a case where the reproduction laser power margin does not change according to the environment surrounding the super-resolution optical information recording medium, an efficient way to set the optimum reproduction laser power is, for example, as follows:

A reproduction laser power is fluctuated around a reproduction laser power which is set, so that a reproduction laser power at which jitter has a lowest value is set as an optimum reproduction laser power.

By following this way, it is possible to perform the test readings efficiently. Further, in this way, it is possible to determine an optimum reproduction laser power quickly.

Note that, in changing the reproduction laser power, either an increase or a reduction may come first, and certain changes may be alternately repeated. Alternatively, after recommended reproduction laser power information is obtained, a recommended laser power specified by the recommended reproduction laser power information may be set as an optimum reproduction laser power.

An optical information recording medium reproducing device of the present invention is for reproducing information from an optical information recording medium, the optical information recording medium having the information stored therein by positioning a plurality of marks according to a predetermined system, the plurality of marks having lengths regularly different from each other and including a mark shorter than an optical system resolution limit of the optical information recording medium reproducing device, the optical information recording medium reproducing device performing, by emission of laser light, a plurality of test readings each measuring an index relating to a reproduction quality of the optical information recording medium, in order to set, according to the indexes measured, a reproduction laser power for reproducing the information, the plurality of test readings being performed while a reproduction laser power is changed from a predetermined initial value by a predetermined change amount.

With this arrangement, in reproduction of the information from the super-resolution optical information recording medium, the optical information recording medium reproducing device performs the test readings in order to set the reproduction laser power optimum for reproduction of the information from the optical information recording medium. Then, according to the indexes each relating to the reproduction quality which indexes have been obtained as a result of the test readings, the reproduction laser power is determined. Thus, it is possible to determine the reproduction laser power favorable for reproduction of the information from the optical information recording medium, thereby achieving an excellent reproduction quality.

Further, it is possible to reproduce the information from the optical information recording medium without emitting an unnecessarily large reproduction laser power onto a storage surface of the optical information recording medium. This prevents deterioration and the like of a reproduction quality of the optical information recording medium as a medium, thereby improving durability against repeated reproduction.

Here, in order to perform the test readings, (a) a test reading start power, i.e., the reproduction laser power at which the first test reading is started, and (b) a scanning interval, i.e., the predetermined change amount, are set. Note that the predetermined initial value and the predetermined change amount respectively refer to, for example, a reproduction laser power and a change amount each of which is suitable for reproduction of the information from the optical information recording medium and has been obtained in advance by e.g., measurement under a standard condition.

Firstly, the first test reading is performed with the reproduction laser power set as the test reading start power. For a reproduction laser power used in the second test reading, the test reading start power is changed by an amount specified by the scanning interval. In this manner, the reproduction laser power is changed by the amount specified by the scanning interval from the reproduction laser power set in the previous test reading, and then the following test reading is performed.

Here, there is a case where an optimum reproduction laser power fluctuates due to deformation of the super-resolution optical information recording medium, which deformation is caused by a change in the environment during the reproduction (e.g., a change in ambient temperature of the super-resolution optical information recording medium).

Even in such the case, according to the above arrangement, it is possible to perform the test readings with a scanning interval suitable for the individual super-resolution optical information recording medium, thereby reliably and efficiently determining an optimum reproduction laser power which is most suitable. This makes it possible to reproduce information from various super-resolution optical information recording media in a stable manner.

Note that the reproduction laser power may be changed in the test readings so as to be either increased or reduced.

By following this way, it is possible to perform the test readings efficiently. Further, in this way, it is possible to determine an optimum reproduction laser power quickly.

Further, an optical information recording medium of the present invention includes: a test reading information region storing test reading information with only recording marks each longer than an optical system resolution limit of the optical information recording medium reproducing device, the test reading information being for performing a plurality of test readings.

With this arrangement, since each of the marks constituting the test reading information region has a length equal to or longer than the optical system resolution limit of the optical information recording medium reproducing device, there is no need for the super-resolution reproduction. That is, since it is possible to read out the test reading information without performing the super-resolution reproduction, there is no need for test readings for the test reading information. This makes it possible to efficiently perform the test reading for reproducing content information.

Furthermore, an optical information recording medium of the present invention includes: a data storage region allowing a plurality of marks to be formed therein according to a predetermined system, the plurality of marks having lengths regularly different from each other and including a mark shorter than the optical system resolution limit of the optical information recording medium reproducing device.

With this arrangement, in reproduction of information from the optical information recording medium by the optical information recording medium reproducing device, it is possible to perform the test readings in an efficient manner by following the above-described way, thereby determining an optimum reproduction laser power quickly.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention can be suitably used in a wide range, for example, for optical information recording medium reproducing devices performing the super-resolution reproduction.

The invention claimed is:

1. An optical information recording medium from which an optical information recording medium reproducing device reproduces information by emitting a reproduction laser beam onto the optical information recording medium, said optical information recording medium compromising:
- a substrate on which content information is recorded by a plurality of recording marks forming protrusions and recesses and having different lengths including a length equal to or shorter than an optical system resolution limit of the optical information recording medium reproducing device, the plurality of recording marks being formed according to a predetermined modulation system,
- the optical information recording medium having test reading information stored therein, the test reading information being formed only with recording marks which form protrusions and recesses and each of which is longer than the optical system resolution limit of the optical information recording medium reproducing device, the test reading information including (i) a value of a test reading start power and (ii) a recommended scanning interval for a reproduction laser power, each of which is usable by the optical information recording medium reproducing device to perform a test reading in order to determine a reproduction laser power for reproducing the content information.

2. The optical information recording medium as set forth in claim 1, further comprising:
- a region at which the test reading is to be performed and in which the plurality of recording marks are formed.

3. An optical information recording medium reproducing device for reproducing information from an optical information recording medium recited in claim 2, said optical information recording medium reproducing device comprising:
- a test reading control section for determining, by a test reading, a reproduction laser power for reproducing the content information,
- the test reading control section causing the optical information recording medium reproducing device to perform a measurement of a reproduction signal quality and an index relating to the reproduction signal quality by causing the optical information recording medium reproducing device to emit, according to information indicative of the value of the test reading start power obtained by reproduction of the optical information recording medium, a laser beam at a test reading reproduction laser power onto the region at which the test reading is to be performed,
- the test reading control section causing the optical information recording medium reproducing device to increase or decrease, according to the recommended scanning interval information, a reproduction laser power which is equal to the value of the test reading reproduction laser power, and
- the test reading control section causing the optical information recording medium reproducing device to repeatedly perform the measurement of the reproduction signal quality and the index relating to the reproduction signal quality, in order to determine the reproduction laser power for reproducing the content information.

4. An optical information recording medium reproducing device for reproducing information from an optical information recording medium recited in claim 1, said optical information recording medium reproducing device comprising:
- a test reading control section for determining, by a test reading, a reproduction laser power for reproducing the content information,
- the test reading control section causing the optical information recording medium reproducing device to perform a measurement of a reproduction signal quality and an index relating to the reproduction signal quality by causing the optical information recording medium reproducing device to emit, according to information indicative of the value of the test reading start power obtained by reproduction of the optical information recording medium, a laser beam at a test reading reproduction laser power onto a region at which the test reading is to be performed,
- the test reading control section causing the optical information recording medium reproducing device to increase or decrease, according to the recommended scanning interval information, a reproduction laser power which is equal to the value of the test reading reproduction laser power, and
- the test reading control section causing the optical information recording medium reproducing device to repeatedly perform the measurement of the reproduction signal quality and the index relating to the reproduction signal quality, in order to determine the reproduction laser power for reproducing the content information.

* * * * *